United States Patent Office 2,842,184
Patented July 8, 1958

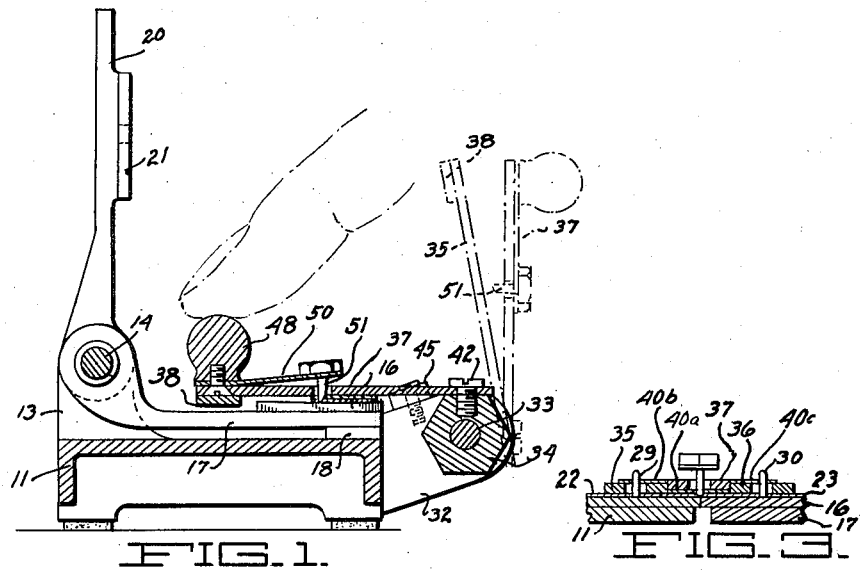

2,842,184

FILM SPLICING DEVICE

Rowe G. Manchester, San Gabriel, Calif.

Application July 27, 1956, Serial No. 600,513

8 Claims. (Cl. 154—42.1)

This invention relates to film splicing devices and has particular reference to splicing devices for motion picture film or the like.

Heretofore, film of the above type was generally spliced by scraping the film emulsion from an end portion of one film section, applying a bonding solution or adhesive and then pressing the end portion of a second film section against the scraped portion of the first. Although this procedure is generally satisfactory, care must be taken to prevent the bonding solution from running over remaining portions of the film and thus distorting one or more film picture frames. Even properly made splices on some types of narrower width films distort or block an adjacent film frame because of the overlapping end sections. Also an appreciable time must be allowed for the bonding solution to dry before the bonded film sections can be removed from the splicing device.

It therefore becomes a principal object of the present invention to obviate the above noted difficulties in splicing film sections.

Another object of the present invention is to provide a device for applying a transparent splicing tape to the abutting ends of two picture film sections.

Another object is to provide a splicing device for severing two film sections along adjacent frame lines and to apply a splicing film over the adjacent ends of such sections.

A further object is to provide a splicing device of the foregoing type in which the ends of the transparent splicing film section coincide with other frame lines of the picture film so as to prevent such ends from distorting the film image.

A further object is to provide a simple and relatively inexpensive film splicing device for applying a transparent splicing film to the adjacent ends of two picture film sections.

The manner in which the above and other objects of the invention are accomplished will be readily understood from the following specification when read in conjunction with the accompanying drawings, wherein:

Fig. 1 is a sectional view through a preferred embodiment of my invention and is taken substantially along line 1—1 of Fig. 2.

Fig. 2 is a plan view of the splicing device shown in Fig. 1 illustrating the same after the splicing film has been applied to two film sections.

Fig. 3 is a transverse sectional view taken along line 3—3 of Fig. 2 illustrating the device in the same condition as shown in Fig. 2.

Fig. 4 is a view similar to Fig. 3 but illustrating the shear pads in a position which they assume after shearing the adjacent ends of two film sections, preparatory to the next operation.

Fig. 5 is a view similar to Fig. 3 but illustrating the outer shear blades in position over the film sections and the transparent splicing film laid thereover preparatory to the final splicing operation.

Fig. 6 is a sectional view taken substantially along line 6—6 of Fig. 2.

Fig. 7 illustrates a motion picture film having a splicing film applied thereto by the device of Figs. 1 to 6.

Referring to the drawings, the splicing device comprises a base 11 having two upstanding brackets 12 and 13 at its rear end to support a pivot rod 14. A film support table pad 15 is suitably secured to the top left hand side of the base 11. A second film support table pad 16 is mounted on an arm 17 pivoted on the rod 14. Normally, the arm 17 rests on a step 18 forming part of the base 11 so as to hold the top surface of the table pad 16 in the same plane as the top surface of table pad 15. Thus, the two pads 15 and 16 normally form a table.

Pivotally mounted on the rod 14 are two combined clamping and shearing arms 19 and 20, each having a surface 21 which can engage the top surface of a film section, i. e. 22 and 23, laid on the associated table pads 15 and 16, respectively. A compression spring 119 extends between the arms 17 and 19 urging these arms apart. However, as the arm 19 is swung toward the pad 15 the left hand edge thereof engages the side of a pin 120 to properly locate this arm laterally.

As will be seen particularly in Fig. 4, the adjacent edges 25 of the shearing arms 19 and 20 extend in line with each other and in alignment with the adjacent edges 26 of the table pads 15 and 16 to effectively shear the ends of film sections clamped between the table pads and the shearing arms.

As is well known, motion picture film has one or two rows of sprocket holes, i. e. 27, located along one side thereof. Locating pins 28, 29, 30 and 31 are suitably fixed on the table pads 15 and 16 to fit in certain of the sprocket holes to maintain the film sections in proper alignment with each other. The pins 28 etc., are so located that when the film sections are located thereover, the sprocket holes of overlapping portions will be in alignment with each other. Also, the center of one sprocket hole 27a is aligned with the aligned edges 25 of the shearing arms.

In shearing two film sections preparatory to splicing the same together, the sections, as at 22 and 23, are placed over respective ones of the pins on the table pads 15 and 16. The shearing arms 19 and 20 are then clamped over the respective film sections and the combined table pad 16 and arm 20 are swung past the table pad 15 and its arm 19, causing the adjacent edges 25 and 26 to shear the film sections, leaving their respective ends in abutting end-to-end relation as shown in Fig. 4.

During the foregoing operation, three shearing blades 35, 36 and 37, to be described in detail later, are swung out of the way as indicated by the dot-dash lines in Fig. 1.

It should be noted that the line formed by the adjoining ends of the film sections extends coincidentally with a frame line defining adjacent picture frames, i. e. 121. This is an important feature since such cut ends will not interfere with the image of either adjacent picture frame integrally with the base 11 at the front thereof are a pair of spaced brackets 32 supporting a cross rod 33. The latter pivotally support three bushings 34 to two of which are secured the two outer shear blade elements 35 and 36. A center shearing blade 37 is attached to the center bushing. The blade elements 35 and 36 form a shear blade assembly and are secured to a cross piece 38 to move as a unit.

The shear blade assembly cooperates with the shearing blade 37 to shear a length of transparent splicing film 40 having a transparent adhesive or bonding material (not shown) applied to its under surface.

To provide for proper adjustment and shearing action, the blade elements 35, 36 and blade 37 have laterally elongated slots 41 therein at their forward ends through which clamp screws 42 extend, the latter being threaded into respective ones of the bushings 34. Similar attaching means, including clamp screws 43, are provided for attaching the rear ends of the blade elements 35 and 36 to the cross piece 38.

Adjustable eccentric guide bushings 44 and 45 are provided, the latter being clamped to respective ones of the brackets 32 by clamp screws 46. Thus, as the blade assembly is swung counter-clockwise into its full line position shown in Figs. 1 and 2 into contact with the previously sheared film sections 22 and 23, the blade elements 35 and 36 engage the sides of the eccentric guide bushings to slightly spring such blade elements inwardly toward each other or at least to prevent any outward springing action during shearing of the splicing film 40.

A knob 48 is secured to the shearing blade 37 along with one end of a yieldable leaf spring 50, the other end of which carries a locating pin 51 which extends through an opening in the blade 37.

It will be noted that the shearing blade 37 is of such a width that its outer edges are aligned with the frame lines, i. e. 52 and 53 (Fig. 7) of the respective film sections. Also, the blades 35, 36 and 37 are of the same width, permitting interchanging in the event one edge of one of the blades becomes dull or damaged. Further, the two locating pins 29 and 30 are longer than the pins 28 and 31 and extend through openings 54 in the blade elements when the blade assembly is swung against the film sections.

In effecting a splicing operation, and after the film sections are properly sheared as noted hereinbefore, the shearing arms 19 and 20 are swung out of place into their full line positions of Fig. 1. The shear blade assembly is then swung against the film sections, holding the same in place. Thereafter, the splicing film 40, having sprocket holes along at least one edge thereof, is located over the two pins 29 and 30 and pressed against the upper surfaces of the blade elements 35 and 36 as shown in Fig. 5. Finally, and while the blade assembly is held in place, the blade 37 is swung counter-clockwise toward its position shown in Fig. 1. During this movement, the locating pin 51 will first engage an aligned sprocket hole in the splicing film located directly over sprocket hole 27a. Thereafter, the blade 37 will shear the splicing film in a scissors action and finally it will press the sheared splicing film section 40a against the film sections leaving the composite film as shown in Fig. 7. During the final movement of the blade 37 the pin 51 will engage the table pads 15 and 16 causing the spring 50 to yield into its position shown in Fig. 1.

The sheared ends 40b and 40c of the splicing film appearing in Figs. 2 and 3 are then removed from the top surfaces of the blade elements 35 and 36 and are thrown away.

As seen in Fig. 6 the pin 29 (as well as the pin 30) is inclined slightly forwardly i. e. to the right in this figure. Also, the back edge 129 is additionally inclined. This enables the splicing film to be located slightly to the right (in Figs. 1 and 6) of the film sections when applying such splicing film to the top surfaces of the shear blade elements 35 and 36. Now, when the blade 37 is swung downwardly, the resulting shearing or scissors action on the splicing film will cause the sheared section 40a to creep rearwardly a slight amount and thus become accurately aligned with the film sections 22 and 23 just as such section 40a touches these film sections.

Although it is preferable to use an adhesive backed transparent splicing film as described hereinabove, a non-adhesive backed splicing film can be used. In this case, a bonding solution is applied to surfaces of the adjacent end picture frames of the two film sections and when these surfaces become tacky, the splicing film is applied as previously described.

If desired in order to obtain a stronger splice, the composite film may be turned over and the above splicing operation repeated to apply a second splicing film section on the opposite surface.

It will be seen that the splicing operation can be carried out by the use of my device without the necessity of leaving one's fingerprints on the picture portions of the film sections or splicing films.

Having thus described my invention, what I desire to secure by United States Letters Patent is:

1. A film splicing device comprising the combination of means forming a table, means on said table for locating a pair of film sections to be spliced in end to end relation; a shear blade assembly cooperable with said table for holding said film sections on said table, said blade assembly comprising two spaced pivoted blade elements, and a pivoted shearing blade movable between said blade elements and in shearing relation therewith for shearing a section of splicing film laid over said blade elements and for pressing said splicing film section against the adjacent end portions of said film sections.

2. A film splicing device comprising the combination of means forming a table, means on said table for locating a pair of film sections to be spliced in end to end relation; a shear blade assembly cooperable with said table for holding said film sections on said table, said blade assembly comprising two spaced pivoted blade elements, said locating means being effective to locate a splicing film on said blade elements, and a pivoted shearing blade movable between said blade elements and in shearing relation therewith for shearing a section of said splicing film extending between said blade elements and for pressing said splicing film section against the adjacent ends of said film sections.

3. A film splicing device comprising the combination of means forming a table, a plurality of film locating pins extending from said table for locating a pair of film sections to be spliced in end to end relation; a pivoted combined pressure and shear blade assembly cooperable with said table for holding said film sections on said table, said blade assembly comprising two spaced blade elements, said pins being effective to locate a splicing film on said blade elements in cooperable relation with said film sections, and a pivoted shearing blade movable between said blade elements and in shearing relation therewith for shearing a section of said splicing film and for pressing said splicing film section against the adjacent ends of said film sections.

4. A film splicing device comprising the combination of means forming a table, a plurality of film locating pins extending from said table for locating a pair of film sections to be spliced in end to end relation; a pivoted combined pressure and shear blade assembly cooperable with said table for holding said film sections on said table, said blade assembly comprising two spaced blade elements, said pins being effective to locate a splicing film on said blade elements in cooperable relation with said film sections, a pivoted shearing blade movable between said blade elements for shearing a section of said splicing film and for pressing said splicing film section against the adjacent ends of said film sections, and a locating pin carried by said shearing blade and effective to locate said splicing blade section in cooperable relation with said film sections.

5. A film splicing device comprising the combination of means forming a table, means on said table for locating a pair of film sections to be spliced in end to end relation; a shear blade assembly cooperable with said table for holding said film sections on said table, said blade assembly comprising two spaced blade elements, a shearing blade movable between said blade elements for shearing a section of splicing film laid over said blade elements and for pressing said splicing film section against the adjacent end portions of said film sections, and a locating pin carried by said shearing blade and effective to located said splicing blade in cooperable relation with said film sections.

6. A film splicing device comprising the combination of a pair of table elements, a pair of pivoted combined shearing and clamping plates cooperable with said table elements to shear a pair of film sections in end to end relation; means on said table elements for locating said film sections in said end to end relation, a combined pressure and shear blade assembly cooperable with said table elements for holding said film sections thereon, said blade assembly comprising two spaced blade elements, and a shearing blade movable between said blade elements for shearing a section of splicing film laid over said blade elements and for pressing said splicing film section against the adjacent end portions of said film sections.

7. A film slicing device comprising the combination of a pair of table elements, a pair of pivoted combined shearing and clamping plates cooperable with said table elements to shear a pair of film sections in end to end relation, a plurality of film locating pins extending from said table elements for locating said film sections in said end to end relation; a pivoted combined pressure and shear blade assembly cooperable with said table elements for holding said film sections thereon, said blade assembly comprising two spaced blade elements, said pins being effective to locate a splicing film on said blade elements in cooperable relation with said film sections, and a pivoted shearing blade movable between said blade elements for shearing a section of said splicing film and for pressing said splicing film section against the adjacent ends of said film sections.

8. A film splicing device comprising the combination of a pair of table elements, a pair of pivoted combined shearing and clamping plates cooperable with said table elements to shear a pair of film sections in end to end relation, a plurality of film locating pins extending from said table elements for locating said film sections in said end to end relation; a pivoted combined pressure and shear blade assembly cooperable with said table elements for holding said film sections thereon, said blade assembly comprising two spaced blade elements, said pins being effective to locate a splicing film on said blade elements in cooperable relation with said film sections, a pivoted shearing blade movable between said blade elements for shearing a section of said splicing film and for pressing said splicing film section against the adjacent ends of said film sections, a locating element for said splicing film section, and yieldable means on said shearing blade supporting said locating element in position to locate said splicing film section in cooperable relation with said film sections.

References Cited in the file of this patent

UNITED STATES PATENTS 1,550,038     Rohrdanz et al. _____ Aug. 18, 1925